(No Model.) 9 Sheets—Sheet 1.

G. R. GREEN.
MACHINE FOR MAKING SPIRAL PIPE.

No. 414,524. Patented Nov. 5, 1889.

Attest:
L. Lee.
F. C. Fischer.

Inventor
George R. Green
per Crane & Miller, Attys

(No Model.) 9 Sheets—Sheet 2.
G. R. GREEN.
MACHINE FOR MAKING SPIRAL PIPE.

No. 414,524. Patented Nov. 5, 1889.

Attest:
L. Lee.
F. C. Fischer.

Inventor.
George R. Green
per Crane & Miller, Attys.

(No Model.) 9 Sheets—Sheet 5.

G. R. GREEN.
MACHINE FOR MAKING SPIRAL PIPE.

No. 414,524. Patented Nov. 5, 1889.

Attest:
L. Lee
F. C. Fischer

Inventor.
George R. Green
per Crane & Miller, Attys.

(No Model.) 9 Sheets—Sheet 6.

G. R. GREEN.
MACHINE FOR MAKING SPIRAL PIPE.

No. 414,524. Patented Nov. 5, 1889.

Attest:
L. Lee.
F. C. Fischer.

Inventor.
George R. Green
per Crane & Miller, Attys.

(No Model.) 9 Sheets—Sheet 8.

G. R. GREEN.
MACHINE FOR MAKING SPIRAL PIPE.

No. 414,524. Patented Nov. 5, 1889.

Attest:
L. Lee.
F. C. Fischer.

Inventor.
George R. Green
per Crane & Miller, Attys.

(No Model.) 9 Sheets—Sheet 9.
G. R. GREEN.
MACHINE FOR MAKING SPIRAL PIPE.
No. 414,524. Patented Nov. 5, 1889.

Attest:
L. Lee.
F. C. Fischer.

Inventor.
George R. Green
per Crane & Miller, attys

UNITED STATES PATENT OFFICE.

GEORGE R. GREEN, OF EAST ORANGE, NEW JERSEY, ASSIGNOR TO THE SPIRAL WELD TUBE COMPANY, OF SAME PLACE.

MACHINE FOR MAKING SPIRAL PIPE.

SPECIFICATION forming part of Letters Patent No. 414,524, dated November 5, 1889.

Application filed July 13, 1889. Serial No. 317,473. (No model.)

*To all whom it may concern:*

Be it known that I, GEORGE R. GREEN, a citizen of the United States, residing at East Orange, Essex county, New Jersey, have invented certain new and useful Improvements in Spiral-Welding Machines, fully described and represented in the following specification and the accompanying drawings, forming a part of the same.

The present invention relates to machinery for winding a long strip of sheet metal spirally into a cylindrical pipe, and continuously welding the overlapped edge of the strip where it makes a tangent to such pipe.

The inventions consists in certain details of construction for facilitating the feeding and welding operations, and will be readily understood by reference to the annexed drawings, in which—

Dotted lines $n$, $n^2$, and $n^4$ are shown in Figs. 1, 3, 23, and 24 to represent the movements of the skelp through the machine.

Figure 1:
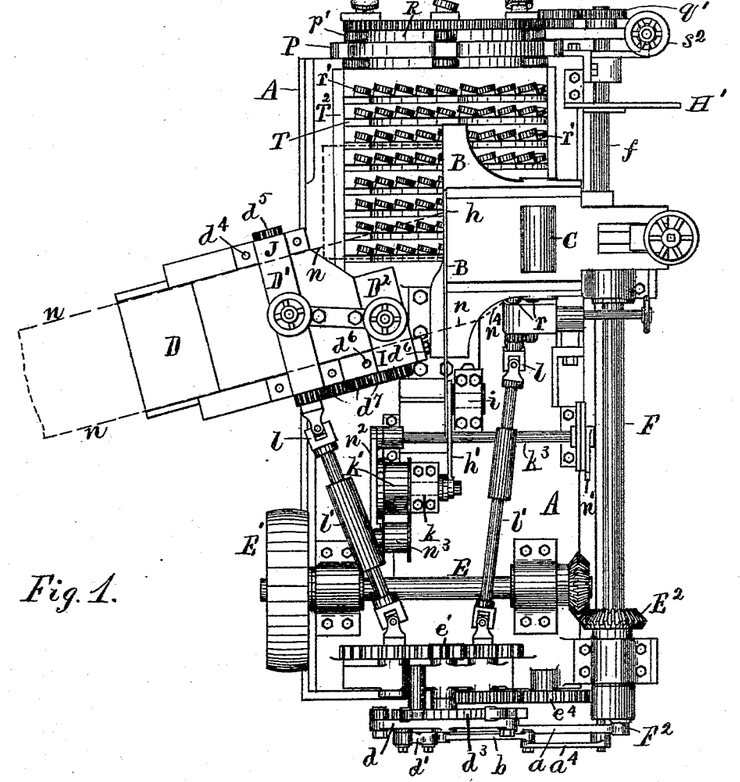
Figure 1 is a plan of the machine with some of the minor details omitted, as they are fully shown in the enlarged views, and would tend only to confuse the drawing in Fig. 1.
Figure 2:
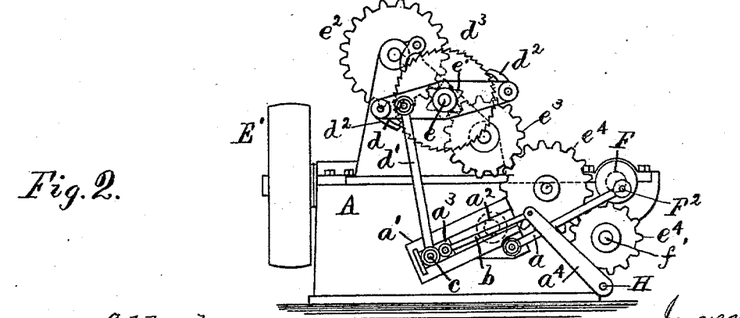
Fig. 2 is an end view of the bed and feed-gearing.
Figure 3:
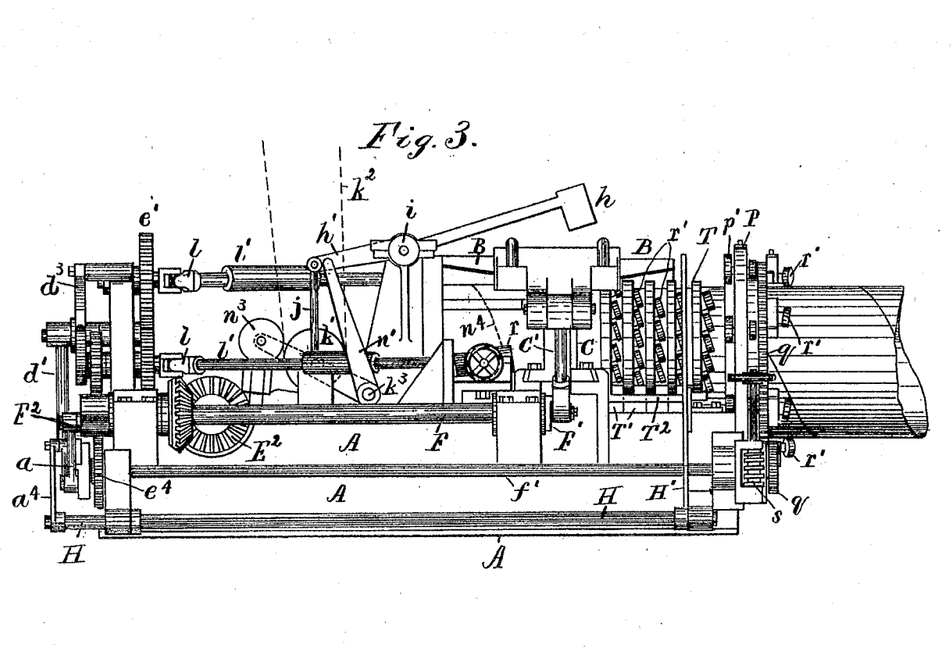
Fig. 3, an elevation at the rear side of the machine.

In Figs. 1, 2, and 3, which are drawn upon a smaller scale than the other figures, A is the bed; $m$, the base of the anvil, the arm of which projects within the pipe during the welding operation, and is covered by the former B, which is hinged upon the post C and vibrated at its rear end by a reciprocating rod C'.

D is the skelp-table sustaining primary rolls D', which span the entire width of the skelp, and secondary rolls $D^2$, which extend over a part only of the same at the inner end of the table, where one edge of the skelp is inclosed in the furnace. To prevent obscuring the pipe-mold beneath the former, the furnace is not shown in Fig. 1, but its location is indicated by the dotted lines $m'$, and the line of the skelp indicated by dotted lines $n$ shows where it passes into one edge of the furnace and under the former B.

E is the driving-shaft; E', the driving-pulley; $E^2$, gears to drive a rear shaft F, provided, as shown in Fig. 3, at one end with a crank F', to actuate the former-connecting rod C'.

$h$ is the hammer (shown very narrow in width in Fig. 1) to strike the weld between the furnace and the former B.

The hammer-head is shown rectangular in Fig. 3, and has a journal pivoted in a box $i$, and is actuated by a lever-arm $h'$ and a link $j$, connected with a crank upon a shaft $k$, Fig. 1. The shaft $k$ is provided with a flanged pulley $k'$, to which an independent belt would be applied, as indicated by the dotted lines $k^2$ in Fig. 3. A rock-shaft $k^3$ is mounted adjacent to the shaft $k$, and has at one end a handle $n'$ and at the opposite end an arm $n^2$, carrying a tightening-pulley $n^3$, adapted to press upon the belt $k^2$ when it is desired to actuate the hammer. At the other end the shaft F is provided with a crank-pin $F^2$, Fig. 2, which is connected by a link $a$ with a slotted feed-arm $a'$. The feed-arm is oscillated upon a pivot $a^2$ by the link $a$, and is provided with a feed-block $a^3$, movable in the arm by link $b$, which shifts the feed crank-pin $c$ to and from the pivot $a^2$. A rock-shaft H is provided to shift the feed-block by means of an arm $a^4$, Fig. 2, the shaft being provided with a handle H′, the position of which may be regulated by a latch $H^2$, fitted to a toothed segment $H^3$, Figs. 3 and 4. The feed-pin $c$ actuates a pawl-arm $d$ by link $d'$ and moves pawls $d^2$ upon a ratchet-wheel $d^3$. The ratchet-wheel actuates a shaft $e$, which, by means of gears $e'$ and $e^2$, transmits motion to the primary feed-rolls D′, and by means of a gear $e^3$ transmits motion to auxiliary feed-rolls $r$, Fig. 1. Universal joints $l$ are shown inserted in the rods $l'$, which connect the feed-gears with the feed-rolls.

The parts hitherto referred to, excepting two sets of feed-rolls on the skelp-table, are nearly the same in their general arrangement and operation as are described in Thomas S. Crane's patent, No. 393,743, dated December 4, 1888, for improvement in spiral-seam-tube-welding machine, and my present invention consists in the other features of construction to be hereinafter described.

Figure 4:
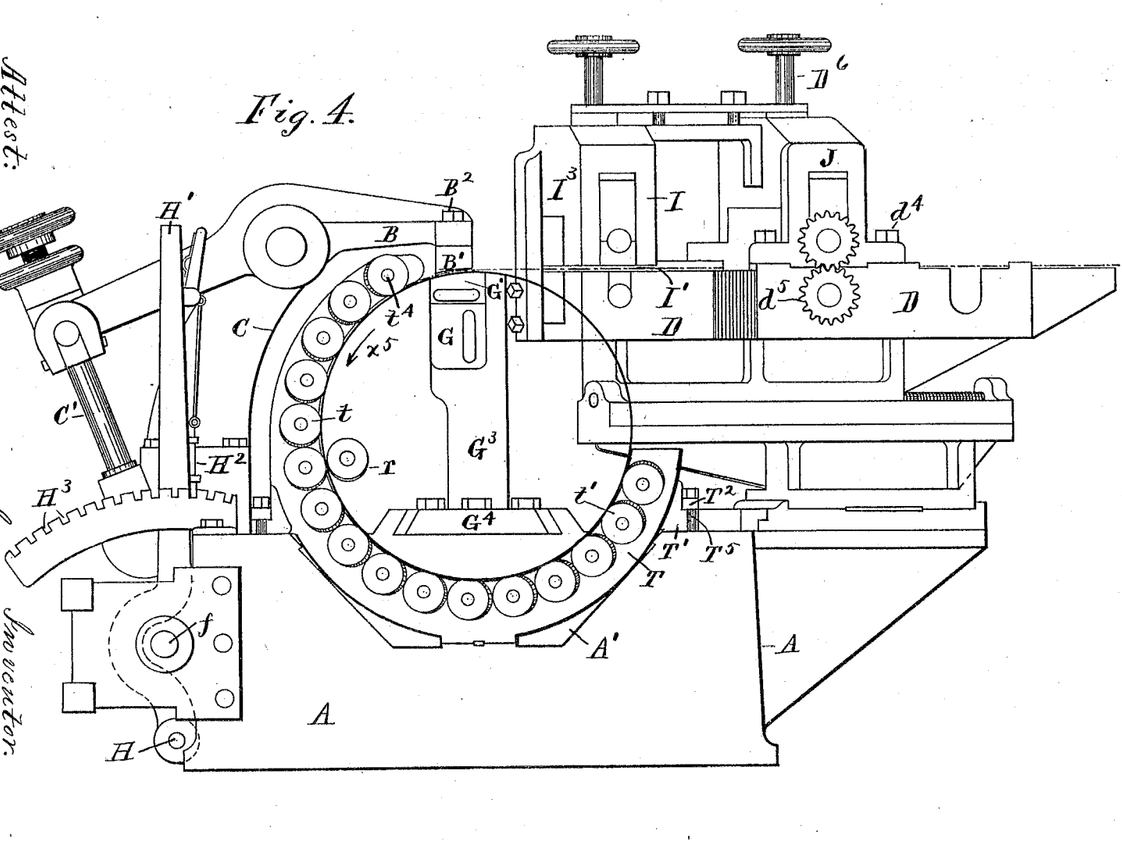
Fig. 4, a view at the opposite end of the machine, with the end feed and heating appliances removed, with a pipe-mold for twenty-four-inch pipe.

The improvement in the anvil consists in fixing the same stationary within the pipe, as shown in Fig. 4, the top of the pipe resting thereon, instead of making the anvil vibrate. The machine shown is adapted for making pipe from twelve inches to twenty-four inches diameter, and the upper surface or head of the anvil is changed to suit the curvature of the pipe.

G is the anvil; G′, its removable head; $G^2$, screws to secure such head in place; and $G^3$, a shank provided with foot $G^4$, by which it is secured to the bed A.

Figure 17:
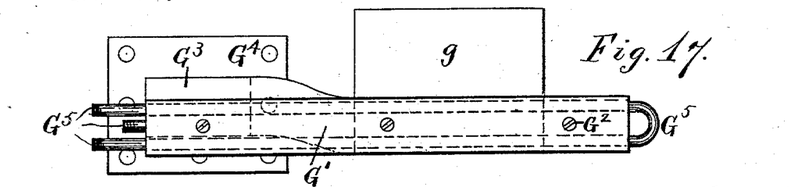
Fig. 17 is a plan of the anvil.
Figures 18, 19, 20:
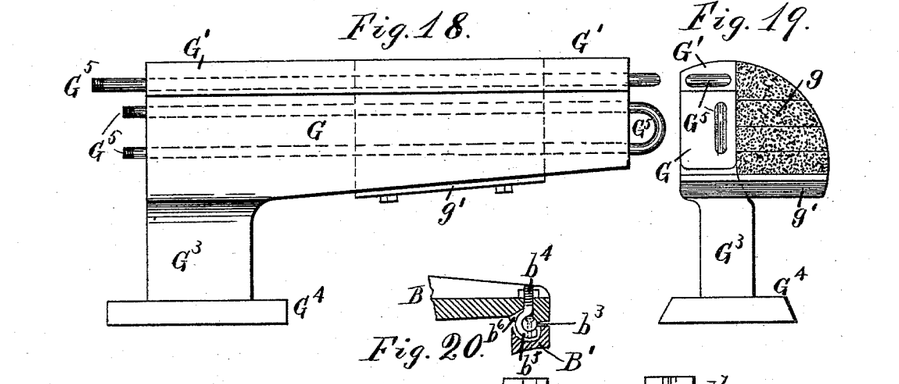
Fig. 18, an elevation of the same upon the opposite side to the furnace.
Fig. 19, an end view of the same fitted up for a sixteen-inch pipe.
Fig. 20, a section of part of the "former" and jaw on line $x'\ x'$ in Fig. 21, which is a view of the under side of the former.

The anvil is cooled by casting wrought-iron water-pipes $G^5$ therein, as shown in Figs. 17 and 18, and the ends of the pipes being, in practice, connected with a water-supply to maintain a constant current through the same.

Figure 23:
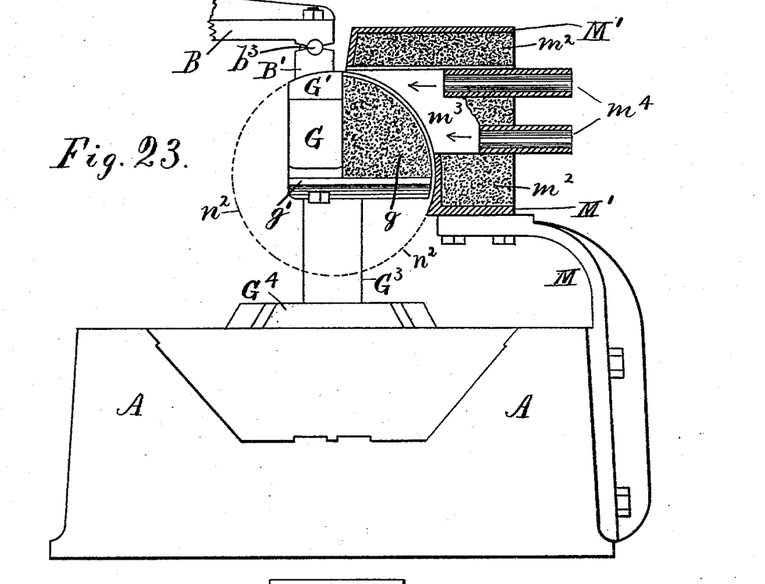
Fig. 23 is a diagram showing the end of the bed with the anvil for sixteen-inch pipe and section of furnace adjacent thereto.
Figure 24:
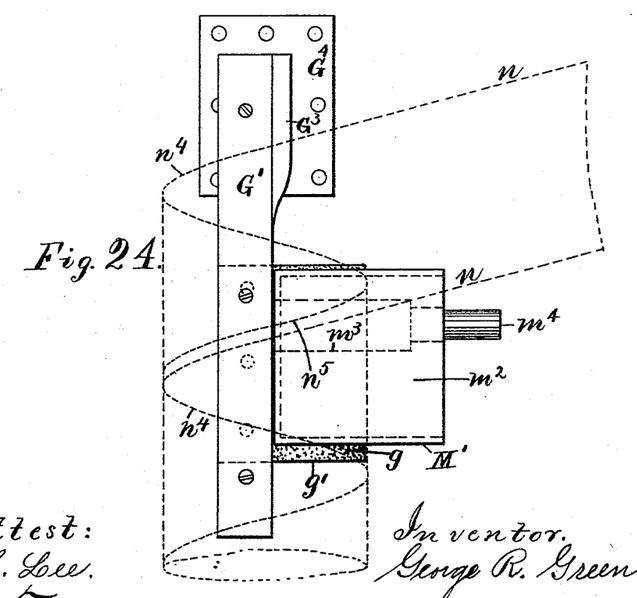
Fig. 24 is a plan of the anvil and furnace detached from their supports.

Another improvement in the anvil consists in supporting upon the same a mass of refractory material $g$ opposite the mouth of the furnace, as shown in Figs. 23 and 24.

M′ is the shell of the furnace, shown supported upon a bracket M, attached to the bed A; $m^2$, the refractory lining of the same, and $m^3$ the cavity into which one or more pipes $m^4$ are inserted to supply mingled air and gas, under suitable pressure, to form a blow-pipe jet directed toward the edges of the sheet metal which require welding. One of these edges consists in the straight edge of the skelp, (indicated by the dotted line $n$ in Figs. 1 and 23,) and the other edge is that of the coiled sheet metal indicated by the dotted circle $n^2$ in Fig. 23, and which, in practice, passes close to the front of the furnace and between the same and the nearer side of the anvil. The material $g$ is shown sustained adjacent to the anvil upon a shelf $g'$, bolted to its under side, and, being opposite the flame discharged from the cavity $m^3$, becomes highly heated.

In Fig. 24 the parallel lines $n$ indicate the path of the skelp as it approaches the anvil, one of the lines passing through the edge of the furnace into the cavity $m^3$. The spiral dotted lines $n^4$ indicate the edges of the sheet metal when bent into a curved form, while the dotted lines $n^5$ show the edges of such coiled metal as it passes between the furnace and the mass of incandescent material $g$.

In Fig. 4, B′ is a jaw secured rigidly to the former by bolts $B^2$, but an alternative construction is shown in Figs. 20 to 23, inclusive, by which the jaw is hinged to the former.

Figure 21:
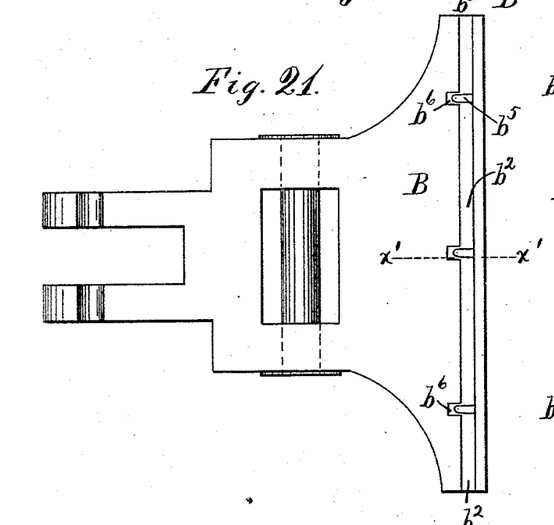
Figure 22:
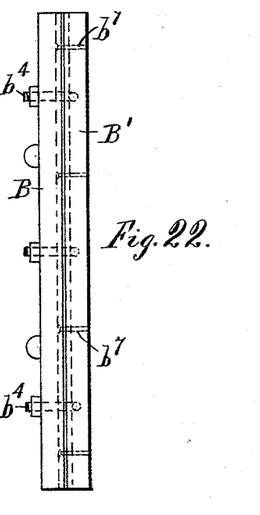
Fig. 22 is an edge view of the former and jaw.

In Fig. 23, $b^2$ are grooves formed in the under edge of the former and the upper edge of the jaw; $b^3$, a round rod attached to the jaw by screws $b^7$, Fig. 22, and in Figs. 20 and 22 bolts $b^4$ are shown with hooked heads $b^5$ inserted in recesses $b^6$ in the under side of the former, as shown in Fig. 21. The hooked bolts hold the rod and jaw upon the former, while the rod forms a hinge between the former and jaw, so that the latter may turn to press evenly upon the curved surface of the anvil. The feeding devices in such a machine have heretofore been confined to the skelp-table D and to a pair of auxiliary rolls $r$, applied to the rear edge of the cylindrical bent skelp below the former, as shown in Figs. 1, 3, and 4.

Figure 15:
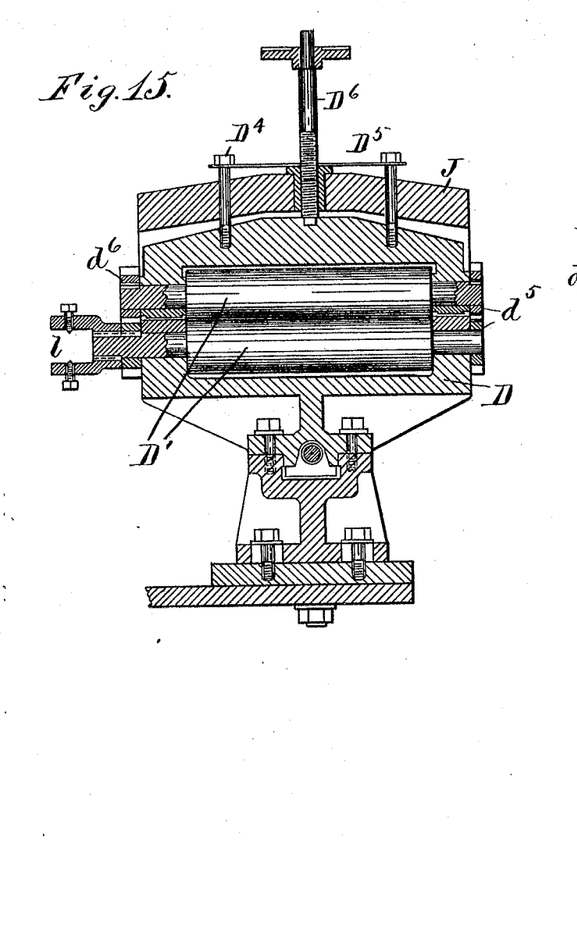
Fig. 15, a section through the feed-rolls, on line $z'\ z'$ in Fig. 13.

In Fig. 3 the dotted line $n^4$ indicates the bent edge of the skelp with the rolls $r$ applied thereto, and in Fig. 4 the roll $r$ represents one of the auxiliary rolls within the skelp, while the other is not shown, as it lies behind the pipe-mold. Heretofore the rolls upon the skelp-table have been located at $D^2$ upon the inner end of the skelp-table D, as shown in Fig. 1, to press upon only one edge of the skelp and part of its width, as the opposite edge, indicated by the line $n$ in Fig. 1, would be inclosed within the furnace. The housing I of such rolls $D^2$ could therefore be attached to the skelp-table at its outer edge only by the bolts $d^6$, Fig. 13, and its upper arch (lettered $I^3$ in Figs. 4 and 16) would be compelled alone to sustain the inner bearing of the roll nearest the furnace. The bearings of the upper and lower rolls $D^2$ could not, therefore, be connected adjacent to the furnace, but would be separated by the gap I′ in Fig. 4 to permit the passage of the skelp. In such construction the housing unavoidably yields at the end next the furnace and does not possess the strength to feed the skelp as positively as one in which the arch of the housing is fastened rigidly by feet and bolts at both ends. I therefore furnish the skelp-table with additional rolls D', located in the rear of the rolls D² (the top of Fig. 1 representing the rear side of the machine) and far enough back to clear the furnace, by which I am enabled to extend the housing J entirely across the skelp, as shown in Figs. 1 and 15, and secure its opposite ends rigidly to the margin of the skelp-table by bolts $d^4$. By this construction I am also enabled to connect the rolls D' with cog-wheels $d^5$ at the outer end in addition to the cog-wheels $d^6$ connecting their inner ends, like those upon the rolls D² in Figs. 13, 14, and 16.

Figure 13:
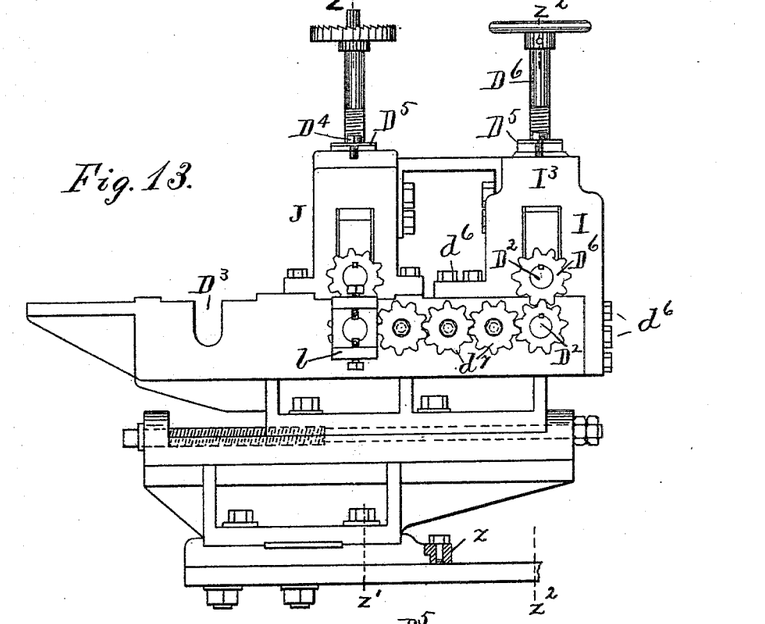
Fig. 13, a side elevation of the skelp-feed table upon the side opposite that shown in Fig. 4, with the gib $z$ in section upon the bottom bed-plate.
Figure 14:
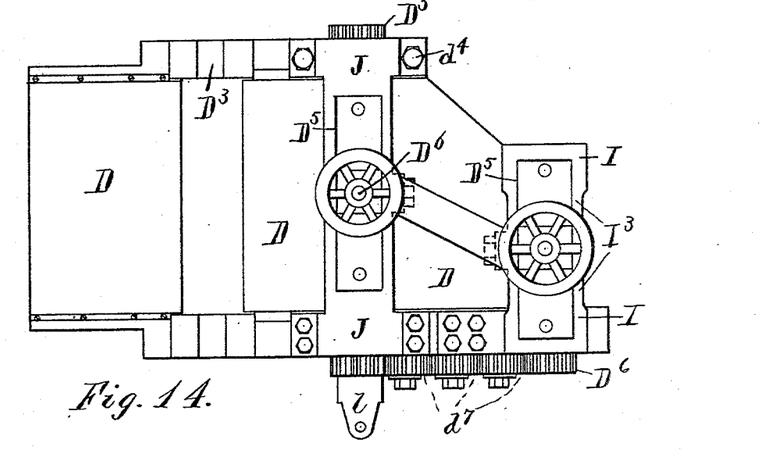
Fig. 14 is a plan of the same.

In Figs. 13 and 14 the gears $d^6$ upon the rolls D' and D² are shown connected by intermediate gears $d^7$, and the lower roll D² is shown provided with the universal joint $l$ to receive the rotary motion from the feed-gearing by the shaft $l'$ and transmit it to the rolls D'.

Figure 16:
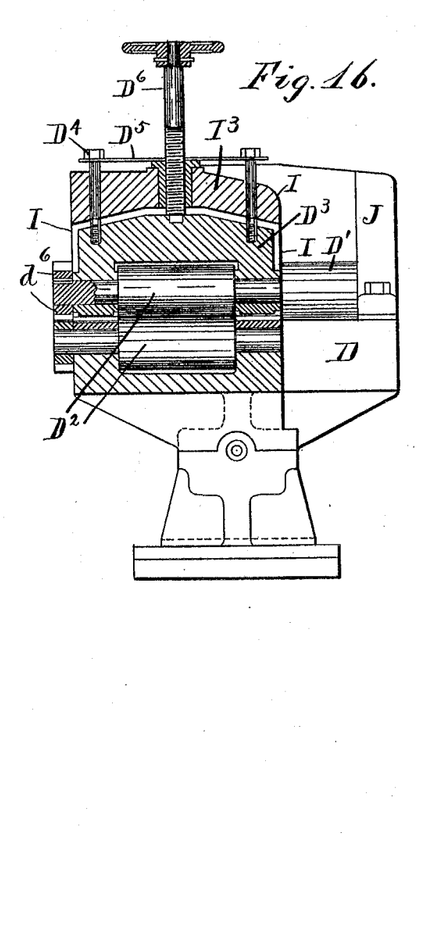
Fig. 16 is a section on line $z^2\ z^2$ in Fig. 13, with a portion of the parts in the rear of the section-plane.

In Figs. 15 and 16 the upper roll-bearings are shown mounted in movable heads D³, suspended by bolts $D^4$ from springs D⁵ and adjusted by means of screws D⁶. The skelp-table itself is also shown in the various figures provided with means as the gib $z$ in Fig. 13 for adjusting it in different positions; but these details form no part of my present invention.

In Figs. 15 and 16 a notch D⁸ is shown in the skelp-table, back of the rolls D², in which an additional pair of rolls may be fitted by mounting a suitable housing upon the table to increase the grip of the feeding appliances upon the skelp.

The former is reciprocated upon the anvil as the skelp is intermittingly fed forward from the table by the action of the pawl $d^2$ upon the ratchet-wheel $d^3$, and a pipe-mold is required to guide the bent metal from the anvil in a cylindrical path ($n^2$ in Fig. 23) beneath the anvil to the furnace, and to the opposite side of the anvil to bring it adjacent to the heated edge of the straight skelp.

The pipe-mold has heretofore been formed of a plain metallic shell, and all the feeding appliances applied to the straight skelp or to the rear edge of the bent skelp, as the rolls $r$, operate by pushing the same into the pipe-mold, and great trouble has heretofore been experienced by the crowding or expansion of the skelp within the mold, especially when the first end of a new skelp is started into the machine.

To prevent the sticking of the skelp within the mold, I have therefore devised a mold provided at frequent intervals with anti-friction rolls $r'$, set parallel to the spiral seam of the pipe, by which the skelp is held effectively in cylindrical form. The friction of the sheet metal against the mold is thus avoided, and the inclination of the rollers operates to pull the pipe forward within the mold as fast as it is produced. The rolls $r'$ may be inserted through holes formed in a cylindrical shell; but to facilitate the supporting of their pivots at the various angles required around the periphery of the pipe I make the mold in a series of flat sections T, Figs. 10 and 12, provided with feet T', and clamped side by side upon the bed A by bars T², Figs. 1 and 3.

Figures 7, 8, 9, 10, 11, 12:
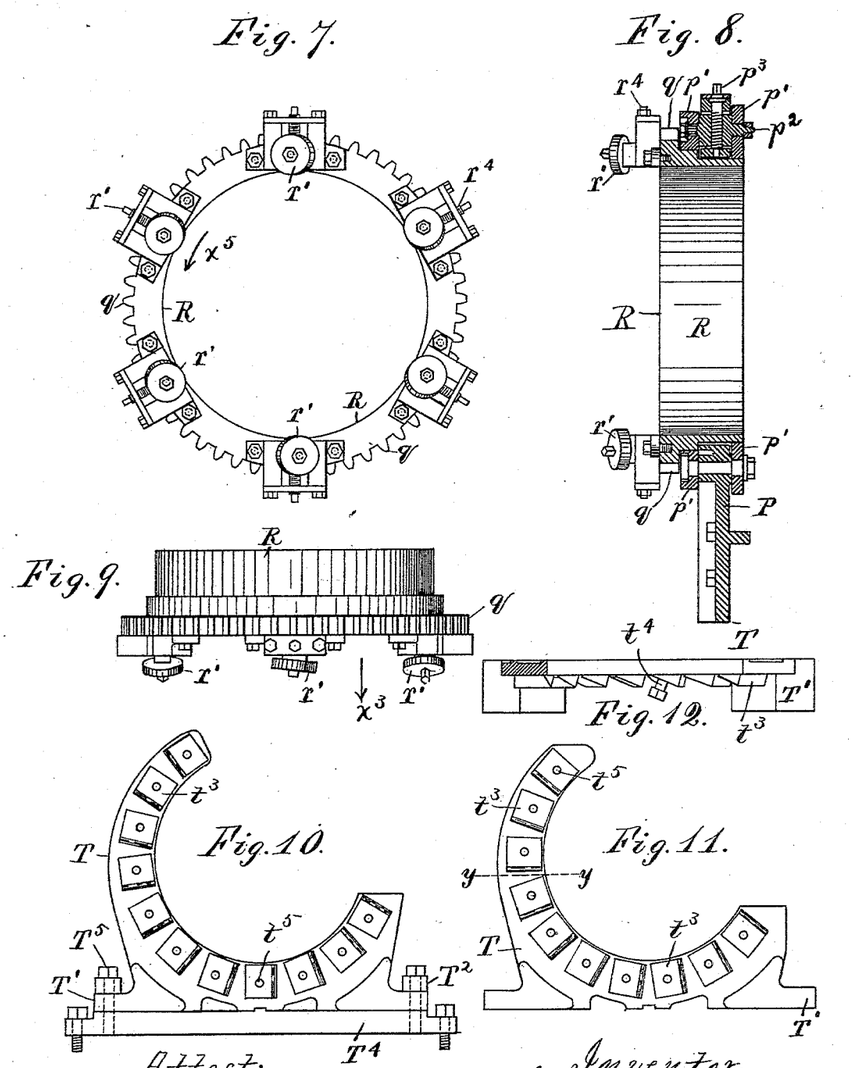
Fig. 7 is an elevation of the end feed-ring removed from the frame shown in Fig. 5.
Fig. 8 is a vertical section at the center of the frame shown in Fig. 5, and including also the feed-ring shown in Fig. 7.
Fig. 9 is a plan of the feed-ring removed from the frame, as in Fig. 7.
Fig. 10 is an elevation of one of the pipe-mold sections suited for sixteen-inch pipe.
Fig. 11, an elevation of the intermediate section of the same pipe-mold.
Fig. 12, a plan of the same in section on line $y\ y$ in Fig. 11.

In Fig. 10 eleven seats are shown upon the section, while in Fig. 11, which would be set intermediate with sections like Fig. 10, only ten seats are provided, by which arrangement the bearing of the rolls upon the pipe is alternated in each of the sections. Each section is provided with a series of seats $t^3$, inclined parallel with the seam of the pipe, and the rolls $r'$ would be pivoted upon the seats by bolts $t^4$ inserted in holes $t^5$ in the seats.

In Figs. 1 and 3 the sections and rolls are shown in conjunction, while Figs. 10, 11, and 12 show only the sections without the rolls, and only one of the bolts $t^4$ projected from one of the seats in Fig. 12.

Figure 5:
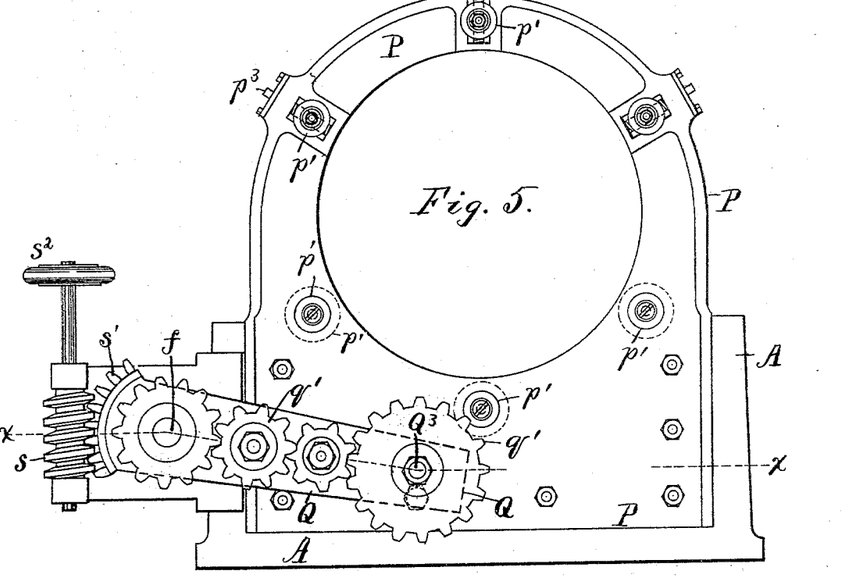
Fig. 5 is a view at the same end of the bed, showing the frame P and train of gearing for actuating the end feed, the frame shown being suited for twenty-four-inch pipe.
Figure 6:
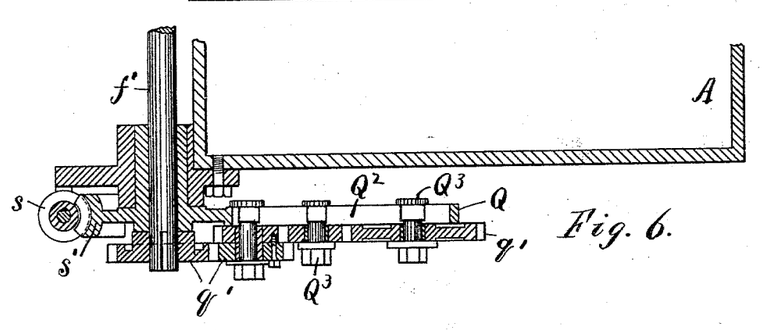
Fig. 6 is a plan of the same in section on line $x\ x$ in Fig. 5.

In Fig. 4 one of the sections T is shown with its feet T' clamped by the bar T² to the bed A, with the section extending downward into a recess A' in the top of the bed. Where sections for smaller pipe are used, like those shown in Figs. 10 and 11, they would be supported upon the top of the bed by a plate T⁴, the end of which is shown in Fig. 10 with the bar T² clamped thereto by bolts T⁵. By this construction the drilling of the holes $t^5$ in the separate mold-sections is greatly facilitated, and a mold of any length may be readily constructed by clamping a suitable number of sections in proximity to one another upon the bed, as shown in Figs. 1 and 3.

Where a seam or other irregularity in the pipe tends to produce a sticking of the same in the mold it has been found desirable to furnish a feed outside of the mold, which should operate by pulling the pipe axially from the same. Such feed I have devised as a ring R, provided with inclined rolls $r'$, pressed elastically upon the exterior of the pipe and rotated positively at such a rate in relation to the obliquity of the rolls as to draw the pipe forward from the mold in the direction of the arrow $x^3$, Fig. 9. The ring is preferably carried upon anti-friction wheels $p'$, mounted on a frame P adjacent to the outer end of the mold, and is provided with cogs $q$, driven by a train of wheels $q'$ from the shaft $f'$. For making different sizes of pipe the frame P and ring R would be altered in dimensions, and to rotate rings of different sizes by the same gearing the wheels $q'$, as shown in Figs. 5 and 6, are mounted upon an arm Q, pivoted upon the shaft $f'$ and adjustable around such shaft by a worm $s$ and segment $s'$. By turning a hand-wheel $s^2$ upon the worm $s$ the outer gear $q'$ upon the arm Q may be adjusted to properly mesh with the cogs $q$ upon a ring of any size.

The arm Q is shown in Fig. 6 formed with a slot $Q^2$ to adjust the gear-studs $Q^3$ at pleasure, so that various cog-wheels may be used to change the rate of feed. As shown in Fig. 8, the anti-friction wheels $p'$ are fitted in pairs upon studs at the opposite sides of adjustable blocks $p^2$, which by means of screws $p^3$ may be moved to fit the wheels snugly to the exterior of the ring R. In like manner the oblique rolls $r'$ are mounted upon the ring R by adjustable screws $r^4$ to press them upon the exterior of the pipe, which, being of thin sheet metal, springs sufficiently between the points of bearing of the six rolls $r'$ to give them an elastic grip on the pipe.

The pipe as it is constructed rotates spirally within the mold and ring R, and it is desirable that the end feed should not oppose such rotary motion, as it would thus act in opposition to the feeding devices upon the skelp-table. The ring R is therefore rotated in the same direction (indicated by the arrows $x^5$ in Figs. 4 and 7) as the pipe and the rolls $r'$ upon the ring are set at an angle contrary to those in the pipe mold, and the ring is rotated at a little greater speed than the pipe itself to produce an end draft upon the latter by the movement of the rolls $r'$ over its surface. The shaft $f'$, which actuates the end feed, being connected by the gears $e^4$ with the ratchet-wheel $d^3$, operates to rotate the ring R intermittingly, the same as the other feeding devices. As the end feed operates upon the finished pipe, it is obviously effective in propelling the latter when the rear end of a skelp passes beyond the feeding-rolls $D'$ $D^2$ and auxiliary rolls $r$, (upon the completion of a pipe or the termination of a length of skelp,) and is thus of great value in removing the finished pipe from the mold, as its operation upon the pipe when it ceases rotating is much more rapid than when the pipe is turning in the same direction with the ring R. A part of the rolls $r'$ in Fig. 1 nearest the furnace appear inclined in the opposite direction from those upon the opposite side of such line, which appearance results from the exposure of the rolls in the bottom of the mold near the furnace and those at the top of the mold at the opposite side of the center line. Such exposure of the rolls arises from the making of the mold with one side open toward the furnace, to facilitate the application of the heat to the edges of the pipe and skelp, for which purpose the mold-sections T are made to embrace only a little more than one-half the circumference of the pipe, as shown in Figs. 10 and 11, which also affords a better opportunity to view the welding operation. The sections T may, however, cover more or less of the pipe at pleasure, or the rolls may be mounted upon a cylindrical shell of the length desired for the mold Having thus set forth my invention, what I claim herein is—

1. In a spiral-welding machine, the combination, with a suitable bed, of a skelp-table to guide the skelp, a pipe-mold to receive and shape the skelp cylindrically, anti-friction rolls sustained upon the pipe-mold parallel with the spiral seam of the pipe, an anvil and former to shape the pipe, and a furnace to heat the sheet metal, substantially as herein set forth.

2. A mold for spiral-welding machines, consisting in a series of flat sections T, provided with a series of inclined seats $t^3$, and a series of rolls $r'$, pivoted upon such seats, and means for clamping the sections adjacent to one another upon the same axial line, substantially as set forth.

3. In a spiral-welding machine, the combination, with an anvil and former for shaping the pipe, of a furnace embracing the straight edge of the skelp adjacent to the pipe, a skelp-table sustained adjacent to the furnace, a pair of rolls upon the skelp-table covering a part of the skelp adjacent to the furnace, and an additional pair of rolls upon the skelp-table spanning the entire width of the skelp, with housing secured to both edges of the skelp-table, as and for the purpose set forth.

4. In a spiral-welding machine, the combination, with an anvil and former for shaping the pipe, of a furnace embracing the straight edge of the skelp adjacent to the pipe, a skelp-table sustained adjacent to the furnace, a pair of rolls upon the skelp-table covering a part of the skelp adjacent to the furnace, an additional pair of rolls upon the skelp-table spanning the entire width of the skelp, with housing secured to both edges of the skelp-table, the universal coupling $l$ for driving one pair of the said rolls, and cog-wheels upon the table connecting the two pairs of rolls, as and for the purpose set forth.

5. In a spiral-welding machine, the combination, with a pipe-mold, a furnace, and an anvil and former for shaping the pipe, of an auxiliary feed-ring applied to the pipe when formed, and provided with rolls adjusted to draw the pipe from the mold as the ring is rotated, substantially as herein set forth.

6. In a spiral-welding machine, the combination, with a pipe-mold, a furnace, and an anvil and former for shaping the pipe, of a skelp-table with feeding-rolls attached thereto, feed-gearing for actuating such rolls, a rotary ring R, applied to the pipe when formed, and provided with rolls adjusted to draw the pipe from the mold as the ring is rotated, and gearing connecting the ring with the feed-gearing of the rolls to operate both simultaneously, substantially as herein set forth.

7. An end feed for spiral-welding machines, consisting in the frame P, the ring R, mounted thereon, the teeth Q, formed upon the ring to rotate the same, and the series of rolls $r'$, mounted adjustably upon the ring, the whole arranged and operated as and for the purpose set forth.

8. An end feed for spiral-welding machines, consisting in the frame P, provided with anti-friction wheels $p'$, the ring R, fitted within such wheels, the teeth Q, formed upon the ring to rotate the same, and the series of rolls $r'$, mounted adjustably upon the ring, as and for the purpose set forth.

9. An end feed for spiral-welding machines, consisting in the frame P, provided with the anti-friction wheels $p^2$ upon its opposite faces, a portion of the wheels being mounted upon the adjustable blocks $p^2$, provided with screws $p^3$, the ring R, fitted within such wheels, the teeth Q, formed upon the ring to rotate the same, and the series of rolls $r'$, mounted adjustably upon the ring, as and for the purpose set forth.

10. In a spiral-welding machine, the combination, with a pipe-mold, a furnace, and an anvil and former for shaping the pipe, of a skelp-table with feeding-rolls attached thereto, feed-gearing for actuating such rolls, a rotary ring R applied to the pipe when formed, and provided with rolls adjusted to draw the pipe from the mold as the ring is rotated, teeth upon the ring to rotate the same, the shaft $f'$, connected with the feed-gearing, the arm Q, pivoted on such shaft, the worm $s$ and segment $s'$ for oscillating the arm, and the change-wheels $q'$, pivoted upon the arm and adapted to drive the teeth upon the ring R, as and for the purpose set forth.

In testimony whereof I have hereunto set my hand in the presence of two subscribing witnesses.

GEORGE R. GREEN.

Witnesses:
H. J. MILLER,
F. C. FISCHER.